(12) United States Patent
Masaki et al.

(10) Patent No.: US 7,554,886 B2
(45) Date of Patent: Jun. 30, 2009

(54) DISK ACCESS DEVICE

(75) Inventors: Kiyoshi Masaki, Hyogo (JP); Kazuhiko Miyazaki, Kyoto (JP); Yoshiyuki Sugahara, Ehime (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/707,270

(22) Filed: Feb. 16, 2007

(65) Prior Publication Data

US 2007/0201318 A1    Aug. 30, 2007

(30) Foreign Application Priority Data

Feb. 17, 2006   (JP)   ............................. 2006-041394

(51) Int. Cl.
    *G11B 17/22*   (2006.01)
(52) U.S. Cl. .................................... 369/30.1
(58) Field of Classification Search ............. 369/30.12, 369/30.27
    See application file for complete search history.

(56) References Cited

U.S. PATENT DOCUMENTS

| | | | |
|---|---|---|---|
| 5,305,159 A * | 4/1994 | Sakai et al. ............. | 360/77.02 |
| 5,343,453 A | 8/1994 | Ogino | |
| 5,953,309 A * | 9/1999 | Yoshimoto et al. ....... | 369/275.3 |
| 6,385,144 B1 | 5/2002 | Kuriuzawa et al. | |
| 6,847,596 B2 * | 1/2005 | Kadlec .................... | 369/44.28 |
| 6,868,053 B2 * | 3/2005 | Gushima et al. ......... | 369/59.11 |

FOREIGN PATENT DOCUMENTS

| | | |
|---|---|---|
| JP | 9-27131 | 1/1997 |
| JP | 11-110763 | 4/1999 |

* cited by examiner

*Primary Examiner*—Mark Blouin
(74) *Attorney, Agent, or Firm*—McDermott Will & Emery LLP

(57) ABSTRACT

A disk access device records to and plays back from a disk on which data recording is performed according to the ZCLV format, and includes a head that reads/writes data from/to the disk. The disk access device calculates a deferment time period that begins upon completion of data reading/writing in the user area of a currently accessed zone and ends when the head enters a predetermined area of the guard track zone following the user area, and a setting time period for performing settings for data reading/writing in the zone to be accessed next. If the deferment time period is shorter than the setting time period, the disk access device moves the head back, when data reading or writing in the currently accessed zone ends, to a position such that the setting time period ends before the head advancing from the position arrives at the predetermined area.

10 Claims, 10 Drawing Sheets

DISK ACCESS DEVICE

BACKGROUND OF INVENTION

1. Field of the Invention

The present invention relates to a disk access device that accesses a disk on which recording is performed according to the ZCLV (Zone Constant Linear Velocity) format or the like, and in particular to head control technology for preventing tracking errors.

2. Related Art

DVD-RAM (Digital Versatile Disk Random Access Memory) disks are characterized by being high-capacity disks on which reading, writing and erasing can be performed. Due to density growth, recording is performed in both lands and grooves that are alternately switched on each revolution of a disk to form a single spiral.

Also, recording at a single data rate across the entire disk is enabled by employing, for example, the ZCLV format in which the disk is divided into a plurality of zones that each include a plurality of tracks, and rotation control is performed according to each of the zones.

Inner and outer peripheries of the zones are provided with guard track zones composed of non-recording tracks in order to prevent a light spot from unintendedly entering an adjacent zone.

However, there are cases in which a tracking error occurs at a zone boundary track, which is the outermost portion of a guard track zone, due to the light spot being influenced by the adjacent zone.

In view of this, there is disclosed technology for preventing the light spot from entering the zone boundary track by, for example, jumping to the next zone from two tracks before the zone boundary track (see Japanese Patent Application Publication No. H11-110763).

However, in recent years disk rotation speeds have been increasing along with the rise in recording/playback speeds. There are now cases in which a greater-than-expected number of tracks pass while performing control setting for access to the next zone, as a result of which the light spot enters the zone boundary track. For example, if control setting is not completed before reaching two tracks before the zone boundary track, the light spot will enter the zone boundary track before jumping to the next zone.

SUMMARY OF INVENTION

In view of the above issue, an object of the present invention is to provide a disk access device that prevents the entry of a light spot into a zone boundary track, and furthermore in which movement between zones is completed in a minimum amount of time.

In order to resolve the above issue, the present invention is a disk access device that accesses a disk on which data recording is performed according to a format including a plurality of zones each including a user area where recording is performed, a guard track zone where recording is not performed being provided between each of the user areas, the disk access device including: a head operable to read and write data from/to the disk; an acquisition unit operable to acquire (i) deferment time information indicating a deferment time period that begins upon completion of data reading or writing in the user area of a currently accessed one of the zones and ends when the head enters a predetermined area of the guard track zone following the user area of the currently accessed zone, and (ii) setting time information indicating a setting time period for performing settings for data reading or writing in one of the plurality of zones to be accessed next; and a control unit operable to, if the deferment time period is shorter than the setting time period, move the head back, when data reading or writing in the currently accessed zone ends, to a position such that the setting time period ends before the head advancing from the position arrives at the predetermined area.

According to this structure, while tracking control is performed to move the head along a track as the disk rotates, settings for moving to the next zone can be performed before the head enters the predetermined area, which is the area of a guard track zone where tracking is unstable, thereby enabling recording/playback processing to be performed without the head moving off of the track.

Here, the deferment time period and the setting time period can be expressed not only as times, but also as sector counts, sector addresses, track counts, or the like.

Also, the head is moved back a minimum required distance from the position where access ended, that is to say, the head is moved back a minimum number of tracks. The above structure enables preventing the reduction in overall processing execution speed that occurs when, for example, simply jumping to the next zone.

In other words, tracking is performed such that the head is prevented from entering the zone boundary track, and furthermore, a move between zones is completed in a minimal amount of time (i.e., the setting time plus the jump time).

Also, the predetermined area of each guard track zone may be a last track thereof.

This structure prevents the head from entering the boundary track, thereby enabling recording/playback processing to be performed without tracking distortions.

Also, the position to which the head is moved may be located such that the head advancing therefrom along a track by rotation of the disk arrives at a position directly before the predetermined area of the guard track zone following the user area of the currently accessed zone when the setting time period has ended.

According to this structure, overall processing execution speed is improved since the time until the next access begins is reduced to a minimum. In other words, given that the time required to perform the move back is reduced to a minimum since the distance of the move back is made minimal, and given that the head arrives at the position directly before the subsequent zone, a jump to the next zone to be accessed can be completed in a minimal amount of time when the next zone to be accessed is the zone subsequent to the currently accessed zone.

Also, the acquisition unit may include a judgment subunit operable to judge whether the zone to be accessed next is the same as the currently accessed zone, and acquires the setting time information according to a result of the judgment, and the control unit may move the head back, when data reading or writing in the currently accessed zone ends, to the position such that the head arrives at a position directly before the predetermined area of the guard track zone following the user area of the currently accessed zone when the setting time period has elapsed.

Also, the acquisition unit may include a judgment subunit operable to judge which of data reading and data writing is to be performed in the zone to be accessed next, and acquires the setting time information according to a result of the judgment, and the control unit may move the head back, when data reading or writing in the currently accessed zone ends, to the position such that the head arrives at a position directly before the predetermined area of the guard track zone following the user area of the currently accessed zone when the setting time period has elapsed.

According to this structure, the move back is made minimal according to current conditions since the setting time period required for the next instance of recording/playback processing is determined differently for recording or playback, and differently according to the zone to be accessed.

In other words, the ability to know whether a move back is necessary eliminates needless jumps, and even when a jump is necessary, enables the jump itself to be made minimal.

Also, the acquisition unit may acquire the deferment time information in accordance with a disk rotation frequency of the currently accessed zone, and the control unit may include a track count obtainment subunit operable to obtain a number of tracks the head is to be moved back, with use of the deferment time period, the setting time period and the disk rotation frequency, and may move the head back the obtained number of tracks.

Also, the acquisition unit may acquire the deferment time information in accordance with a number of sectors per track of the currently accessed zone, and the control unit may include a track count obtainment subunit operable to obtain a number of tracks the head is to be moved back, with use of the deferment time period, the setting time period and the number of sectors per track, and may move the head back the obtained number of tracks.

Also, the acquisition unit may acquire the deferment time information in accordance with a sector cycle of the currently accessed zone, and the control unit may include a track count obtainment subunit operable to obtain a number of tracks the head is to be moved back, with use of the deferment time period, the setting time period and the sector cycle, and move the head back the obtained number of tracks.

This structure enables the move back to be performed more efficiently since the deferment time period is acquired according to the characteristics of the currently accessed zone, and used to obtain the number of tracks to be jumped.

BRIEF DESCRIPTION OF DRAWINGS

These and other objects, advantages, and features of the invention will become apparent from the following description thereof taken in conjunction with the accompanying drawings, which illustrate a specific embodiment of the present invention.

In the drawings:

FIG. 1A shows a zone structure of the DVD-RAM, and FIG. 1B is an enlarged partial view;

DETAILED DESCRIPTION OF PREFERRED EMBODIMENTS

Embodiment

Overview

A disk access device of the present invention moves a position of a head back a minimum required number of sectors after recording/playback in a current zone has ended, in order to ensure a time period required to configure settings for access to a next zone (e.g., setting a disk rotation frequency for the next zone).

Configuration of settings for access to the next zone begins when recording/playback in the current zone has ended, and must be completed before the head enters a zone boundary track. After the settings have been completed, the next zone is jumped to, and access thereto begins.

Accordingly, the time period required to configure settings is ensured by moving the position of the head back a minimum required distance after recording/playback in the current zone has ended.

Also, the number of sectors that the head is moved back is obtained using the disk rotation frequency of the current zone, the sector at which recording/playback ended, etc., and is set to a minimal value.

Below is a description of a constitution of a DVD-RAM and tracking at a zone boundary track, and thereafter follows a description of a structure of the disk access device of the present invention.

Constitution of a DVD-RAM

Figure 1A:
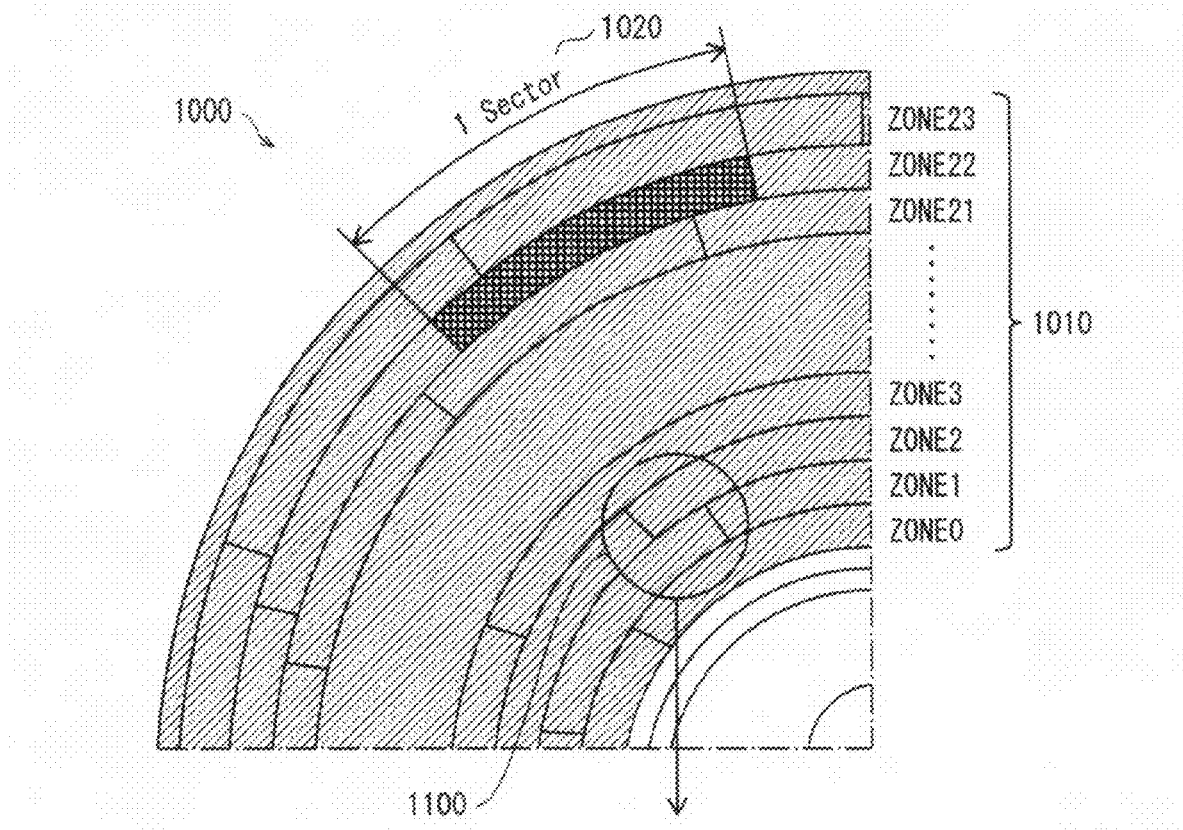
FIGS. 1A and 1B are schematic diagrams showing a sector structure of a DVD-RAM, where
Figure 1B:
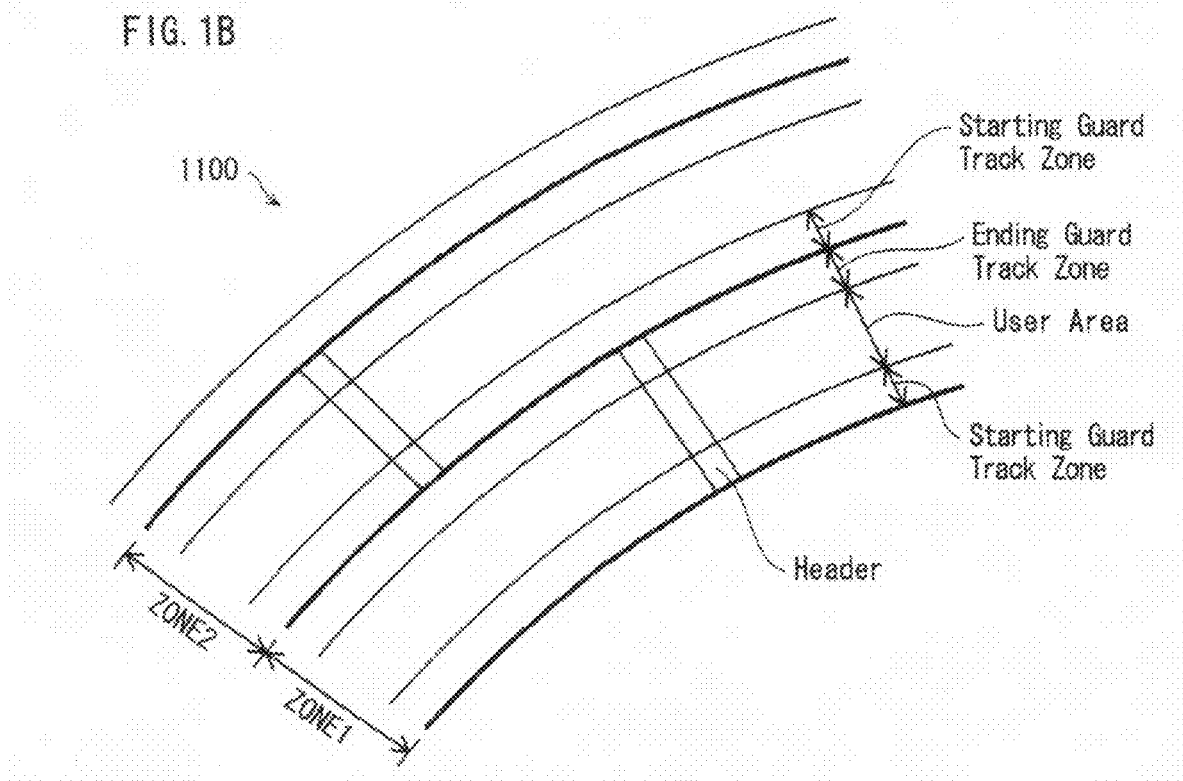

FIGS. 1A and 1B are schematic diagrams showing a sector structure of a DVD-RAM.

FIG. 1A is a schematic diagram showing a zone structure of the DVD-RAM, and FIG. 1B is an enlarged view of a portion 1100.

A DVD-RAM 1000 has been divided into zones that each include a plurality of tracks. The zones are depicted as "ZONE 0" to "ZONE 23" in FIG. 1A (see zones 1010 of FIG. 1A).

Each track includes sectors (see sectors 1020 of FIG. 1A), and all of the tracks in a certain zone include the same number of sectors. Also, all of the sectors in a certain zone have the same data length, and the number of sectors per track increases for each successive zone after an innermost zone.

Rotation control therefore must vary the rotation speed etc. for each of the zones.

Each sector includes a user area and a header, which includes address information recorded as prepits according to CAPA (Complimentary Allocated Pit Addressing). Data is recorded in the user area.

Also, a guard track zone including a plurality of tracks is provided at a starting portion and an ending portion of each of the zones.

The guard track zone provided at the starting portion of a zone is called a "starting guard track zone", and the guard track zone provided at the ending portion of a zone is called an "ending guard track zone".

The last track of the ending guard track zone, that is to say, the track at a boundary with the starting guard track zone of the adjacent zone, is called a zone boundary track. It is in such zone boundary tracks that light spot tracking errors readily occur.

Note that the light spot moves from inner portions of the DVD-RAM to outer portions as the disk rotates.

Figure 2:
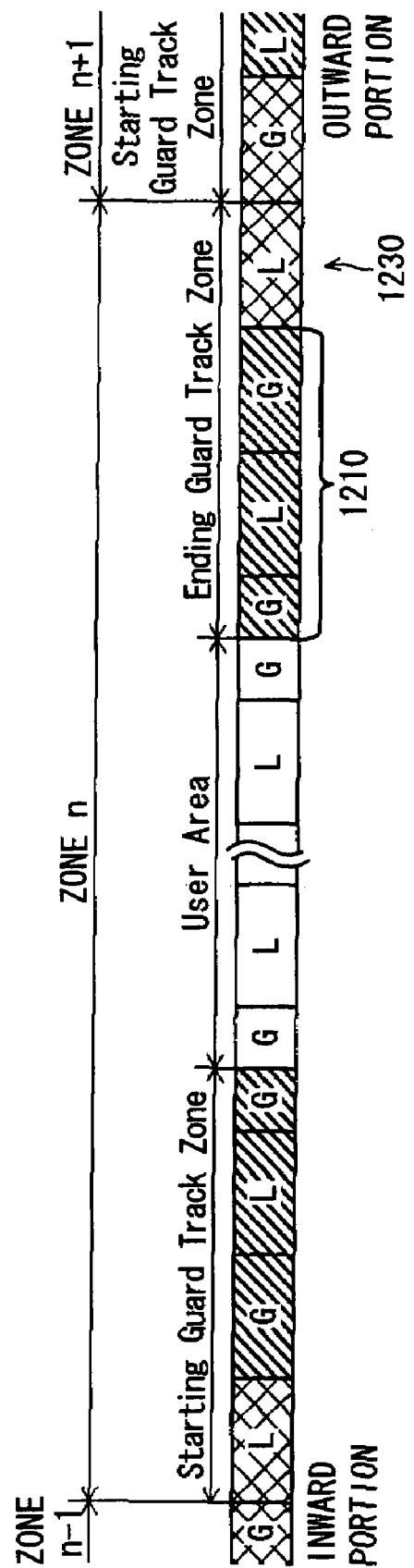
FIG. 2 is a schematic diagram showing guard track zones.

FIG. 2 is a schematic diagram showing guard track zones.

The rectangles of FIG. 2 represent tracks. The left side of FIG. 2 is a more inward portion of the disk, and the right side is a more outward portion of the disk.

In FIG. 2, "G" represents a groove track, and "L" represents a land track.

A track 1230, which is the last track of the ending guard track zone, is a zone boundary track. There is a very high possibility of a tracking error when the light spot enters the track 1230.

As such, the configuration of settings for access to the next zone (here, "ZONE n+1"), should be completed while the light spot is following the other guard tracks 1210.

Tracking in the Zone Boundary Track

Figure 3:
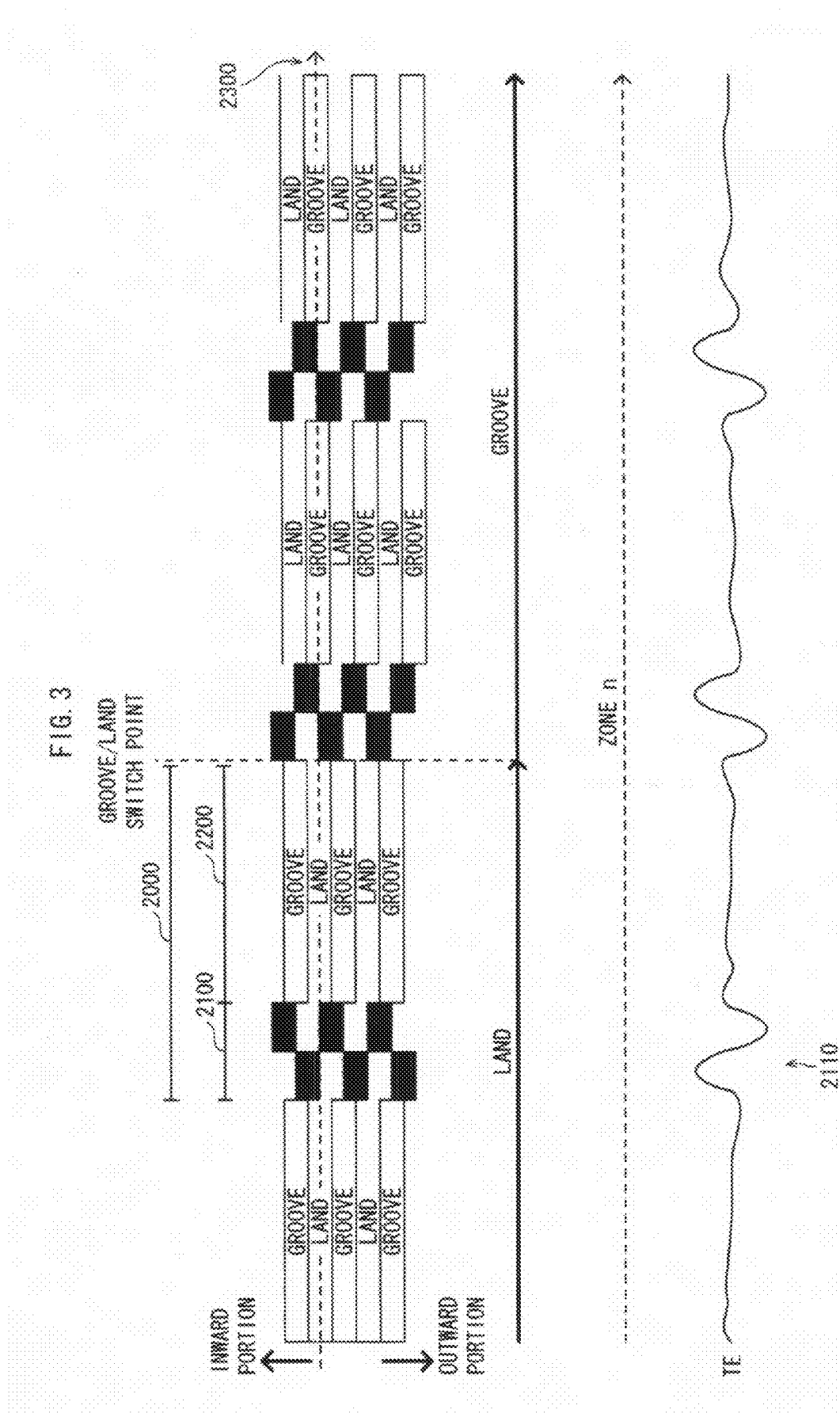
FIG. 3 shows a condition of tracking in a single zone.
Figure 4:
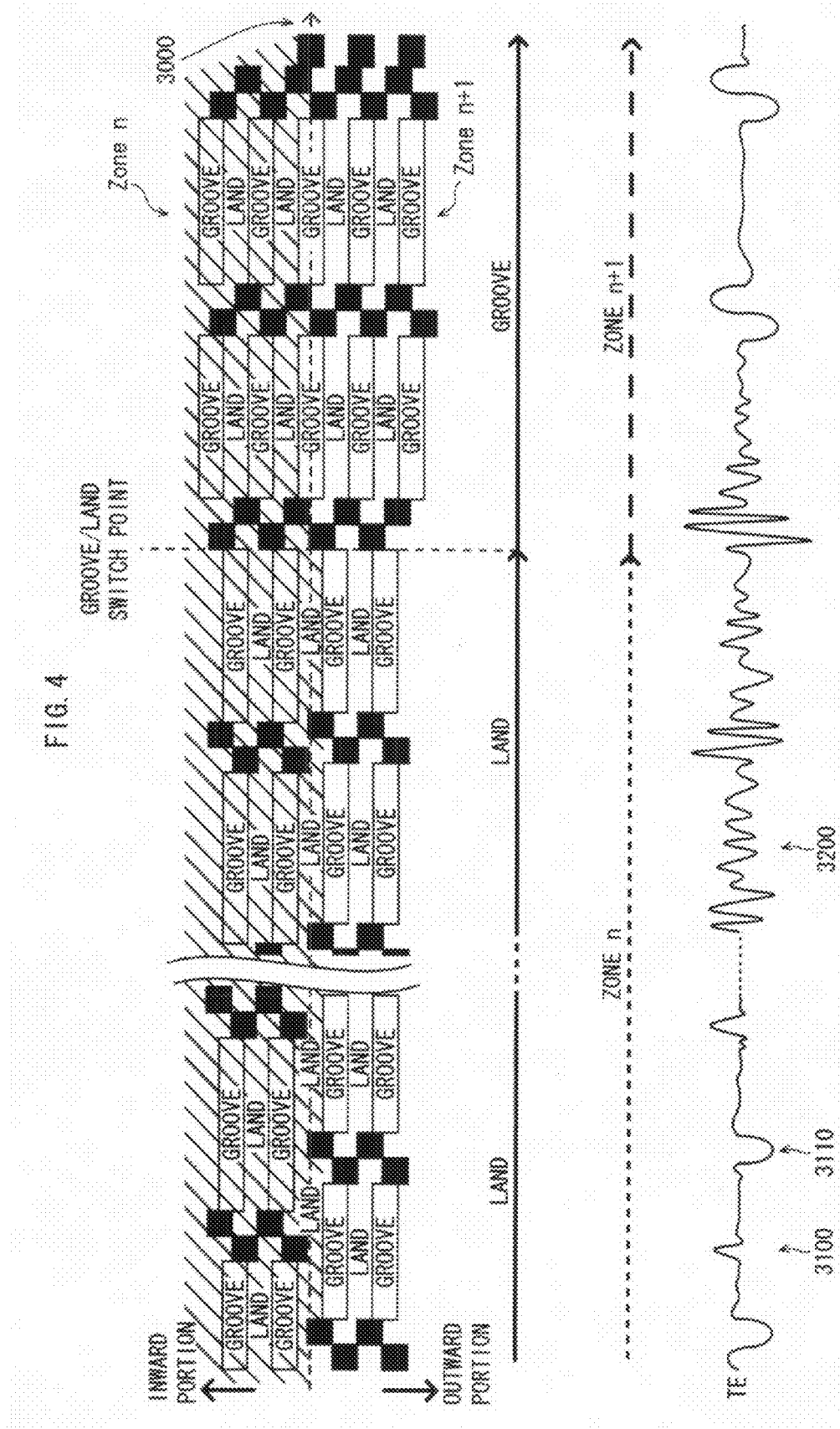
FIG. 4 shows a condition of tracking when crossing to a next zone.

FIG. 3 shows a condition of tracking in a certain zone (zone n), and FIG. 4 shows a condition of tracking when crossing to a next zone.

In FIG. 3, recording/playback is performed as the light spot passes over a header 2100 and a user area 2200 of a sector 2000 (see trajectory 2300), and moves from "LAND" to "GROOVE".

In FIG. 3, "TE" represents a tracking error signal, on the basis of which the position of the light spot is adjusted. The greater the amplitude of the tracking error signal, the greater the error in adjustment of the light spot position.

Although the tracking error signal is distorted while the light spot passes over the header 2100 (see signal 2110), tracking is stabilized by holding the signal since the distortion occurs at a given cycle.

In FIG. 4, the light spot moves from "LAND" to "GROOVE" in the zone boundary track (see trajectory 3000), and moves to the next zone at "groove/land switch point". Track portions including hatching represent zone n, and track portions without hatching represent zone n+1.

It can be seen in the tracking error signal TE that the signal is distorted by the header of the current zone (zone n) (see signal 3100), as well as by the header of the next zone (zone n+1) (see signal 3110).

The tracking error signal is greatly distorted in a vicinity of the groove/land switch point, and a tracking error occurs since tracking drive holding cannot be performed normally.

Although FIG. 4 shows distortion of the tracking error signal TE in two sectors, distortions are not limited to two sectors. Tracking error signal distortions occur in all of the sectors of the zone boundary track.

The following describes the disk access device of the present invention.

Structure of the Disk Access Device

Figure 5:
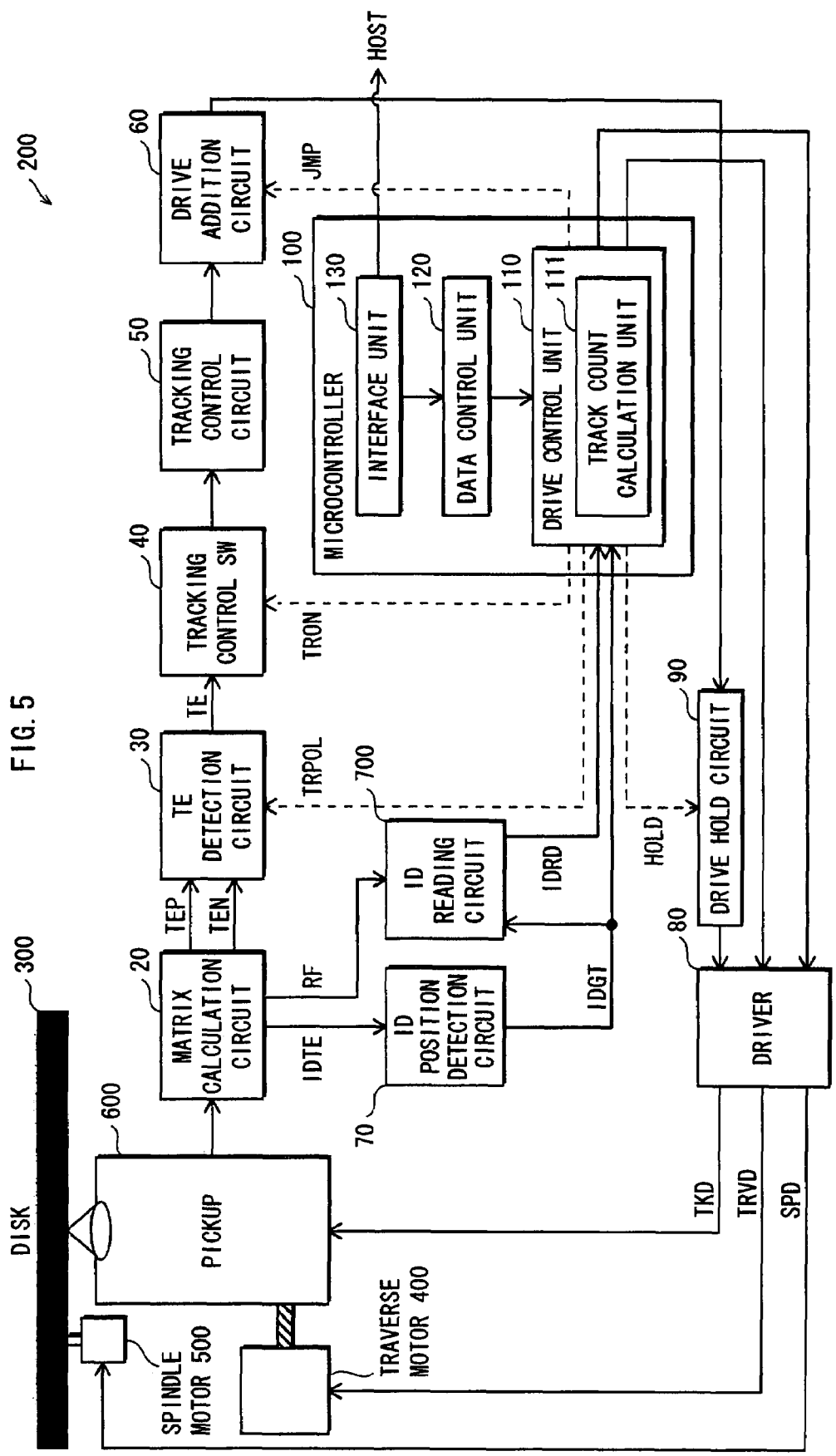
FIG. 5 is a functional block diagram showing a structure of a disk access device.
Figure 6:
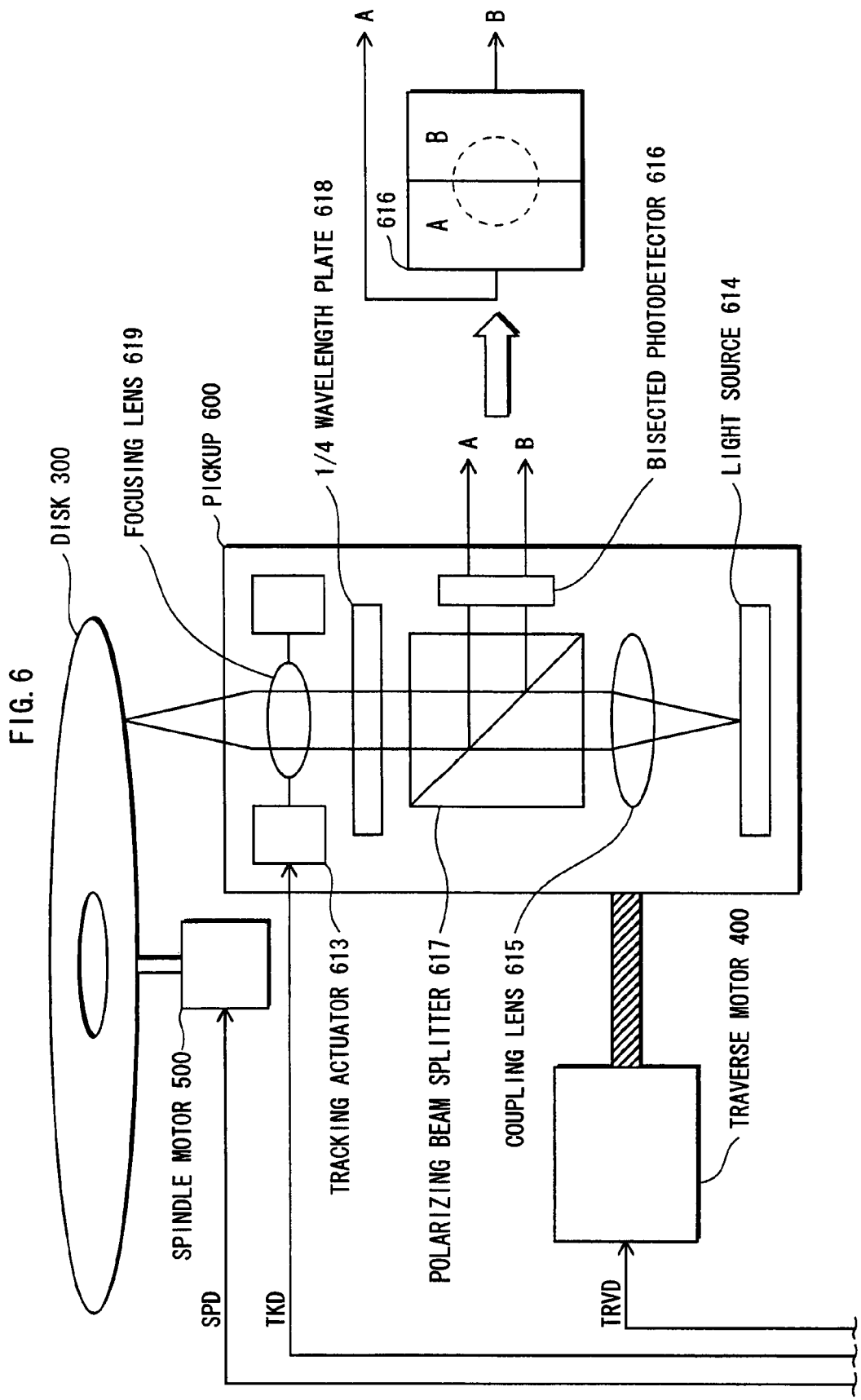
FIG. 6 shows a structure of a spindle motor 500, a traverse motor 400 and a pickup 600.

FIG. 5 is a functional block diagram showing a structure of the disk access device, and FIG. 6 shows a structure of a spindle motor 500, a traverse motor 400 and a pickup 600.

The following describes the structure of the disk access device with reference to FIG. 5 and FIG. 6.

First, as shown in FIG. 5, a disk access device 200 includes the pickup 600, a matrix calculation circuit 20, a TE detection circuit 30, a tracking control SW 40, a tracking control circuit 50, a drive addition circuit 60, an ID position detection circuit 70, an ID reading circuit 700, a driver 80, a drive hold circuit 90, and a microcontroller 100.

In FIG. 5, broken lines represent command signals, and solid lines represent detection signals or drive signals.

The pickup 600 is a so-called head, and performs recording/playback while moving over tracks.

The driver 80 causes the pickup 600, the spindle motor 500 and the traverse motor 400 to operate, by a TKD signal (tracking drive signal), a TRVD signal (traverse drive signal) and an SPD signal (spindle motor drive signal).

The following describes details of structures of the spindle motor 500, the traverse motor 400 and the pickup 600 with reference to FIG. 6.

The spindle motor 500 rotates a disk 300, and the traverse motor 400 moves the pickup 600 for shining a light beam on the disk 300.

The pickup 600 includes a light source 614 such as a semiconductor laser; a coupling lens 615, a polarizing beam splitter 617, a ¼ wavelength plate 618, and a focusing lens 619 on which a light beam generated by the light source 614 successively incidents; a tracking actuator 613; and a bisected photodetector 616 on which the light beam reflected by the disk 300 incidents.

The tracking actuator 613 includes a fixed unit having a permanent magnet, and a movable unit having, for example, a tracking coil. The focusing lens 619 has been attached to the movable unit of the tracking actuator 613.

Also, the bisected photodetector 616 has a bisected light-receiving area, where a direction of the bisecting line thereof corresponds to a track direction on the light-receiving surface.

The following briefly describes operations of the pickup 600.

The disk 300 is rotated at a predetermined rotation frequency (rotating speed) by the spindle motor 500. The light beam generated by the light source 614 is collimated by the coupling lens 615, next passes successively through the polarizing beam splitter 617 and the ¼ wavelength plate 618, and is then focused onto the disk 300 by the focusing lens 619. Reflected light from the light beam exposed onto the disk 300 successively passes through the focusing lens 619 and the ¼ wavelength plate 618, next is reflected by the polarizing beam splitter 617, and thereafter incidents on the bisected photodetector 616. The two light-receiving areas of the bisected photodetector 616 convert the incident light into electrical signals (A and B respectively), which are output to the matrix calculation circuit 20 (see FIG. 5).

The position where the light beam is exposed onto the disk 300 can be adjusted by the traverse motor 400 and the tracking actuator 613.

The traverse motor 400 moves the entire pickup 600 in a radial direction of the disk 300. The tracking actuator 613 moves the light beam in the radial direction of the disk 300, that is, across the tracks, by varying the relative position of the movable unit with respect to the permanent magnet of the fixed unit by using the electromagnetic force generated according to a current flowing in the coil of the movable unit.

In other words, the traverse motor 400 is used when moving the entire pickup 600 in the radial direction of the disk, and the tracking actuator 613 is used when moving the light beam from track to track.

The electrical signals output from the bisected photodetector 616 of the pickup 600 are signals in which the quantities of reflected light received by the two light-receiving areas have been converted to voltages. The matrix calculation circuit 20 shown in FIG. 5 receives such signals, performs filtering, and outputs the filtered signals to the TE detection circuit 30 as a TE(P) signal and a TE(N) signal respectively.

The TE detection circuit 30 outputs a so-called tracking error signal TE, which indicates an amount that the position of the light beam has shifted from a track center, by generating a differential signal between the TE(P) signal and the TE(N) signal.

Also, the matrix calculation circuit 20 outputs an IDTE signal (ID-detection regenerative signal) to the ID position detection circuit 70.

The IDTE signal is a differential signal between the voltage signals output by the bisected photodetector 616 of the pickup 600.

The ID position detection circuit 70 detects variations in the IDTE signal when the light beam passes over the header 2100 (see FIG. 3), and outputs an IDGT signal indicating a position of the header 2100 to the ID reading circuit 700 and a drive control unit 110 of the microcontroller 100.

Moreover, the matrix calculation circuit 20 generates an RF signal (regenerative signal), which is a sum signal of the voltage signals output from the bisected photodetector 616 of the pickup 600, and outputs the generated RF signal to the ID reading circuit 700.

The ID reading circuit 700 reads, with use of the IDGT signal and the RF signal, an address signal formed in the header 2100 by prepits, and outputs the read address signal to the drive control unit 110 as an IDRD signal.

The drive control unit 110 detects, with use of the IDRD signal, a sector address where the light beam is positioned.

The TE detection circuit 30 receives an input of a TRPOL signal (land/polarity inversion signal) from the microcontroller 100, generates the TE signal with use of the TE(P) and TE(N) signals received from the matrix calculation circuit 20, and outputs the generated TE signal to the tracking control SW 40.

Also, the tracking control SW 40 receives an input of a TRON signal (tracking control ON signal) from the microcontroller 100, and controls starting and stopping of operation of the tracking control circuit 50.

The tracking control circuit 50 starts operating in accordance with the drive command TRON signal from the tracking control SW 40, generates a control signal for controlling the position of the light beam, which is adjusted by driving of the focusing lens 610 by the tracking actuator 611, and outputs the generated control signal to the drive addition circuit 60.

Moreover, the drive addition circuit 60 receives an input of a JMP signal (track jump signal) from the microcontroller 100.

The JMP signal (track jump signal) is a signal for causing the light beam to move from track to track, and in general is generated as a set of an acceleration pulse and a deceleration pulse. The acceleration pulse and deceleration pulse are input to the driver 80 via the drive addition circuit 60, converted to a drive current or drive voltage by the driver 80, and output as a TKD signal (tracking drive signal).

The tracking actuator 611 drives the focusing lens 619 in the disk radial direction in accordance with the TKD signal to move the light beam from track to track. Input from the tracking control circuit 50 to the drive addition circuit 60 is cut off at this time, and tracking control resumes when the track jump has ended.

The drive hold circuit 90 holds the tracking drive signal if a HOLD signal (tracking drive hold signal) indicating a hold instruction is received from the microcontroller 100.

The HOLD signal (tracking drive hold signal) is generated by the microcontroller 100 in accordance with the IDGT signal, and the drive hold circuit 90 holds the level of the input to the driver 80 at the same signal level as directly before the light beam entered the header 2100 in order to prevent the TKD signal from being distorted by the header 2100, that has been formed by prepits, when the light beam passes thereover.

This prevents the light beam from shifting from the center of the track during and after passing over the header 2100.

The microcontroller 100 includes the drive control unit 110, a data control unit 120, and an interface unit 130. The drive control unit 110 includes a track count calculation unit 111.

The drive control unit 110 controls driving based on a position received from the ID position detection circuit 70 and the like. Specifically, the drive control unit 110 outputs focus instructions, tracking instructions, and instructions for causing the pickup 600 to move (TKD signal etc.) to the driver 80.

The drive control unit 110 also controls conditions for a track jump and recording/playback, recording operations, and playback operations.

The track count calculation unit 111 obtains a track count, which is a number of tracks that the pickup 600 is to jump. The method for calculating the number of tracks to be jumped is described later with reference to FIG. 6 etc.

The data control unit 120 manages data to be recorded/played back, and issues recording/playback instructions etc. to the drive control unit 110. The data control unit 120 also manages recording/playback addresses, zones numbers, data amounts, and the like.

The interface unit 130 exchanges commands and data with a host such as a personal computer.

The functions of the microcontroller 100 are realized as a result of a CPU executing a program stored in a memory (not depicted) of the microcontroller 100.

Operations

Figure 7:
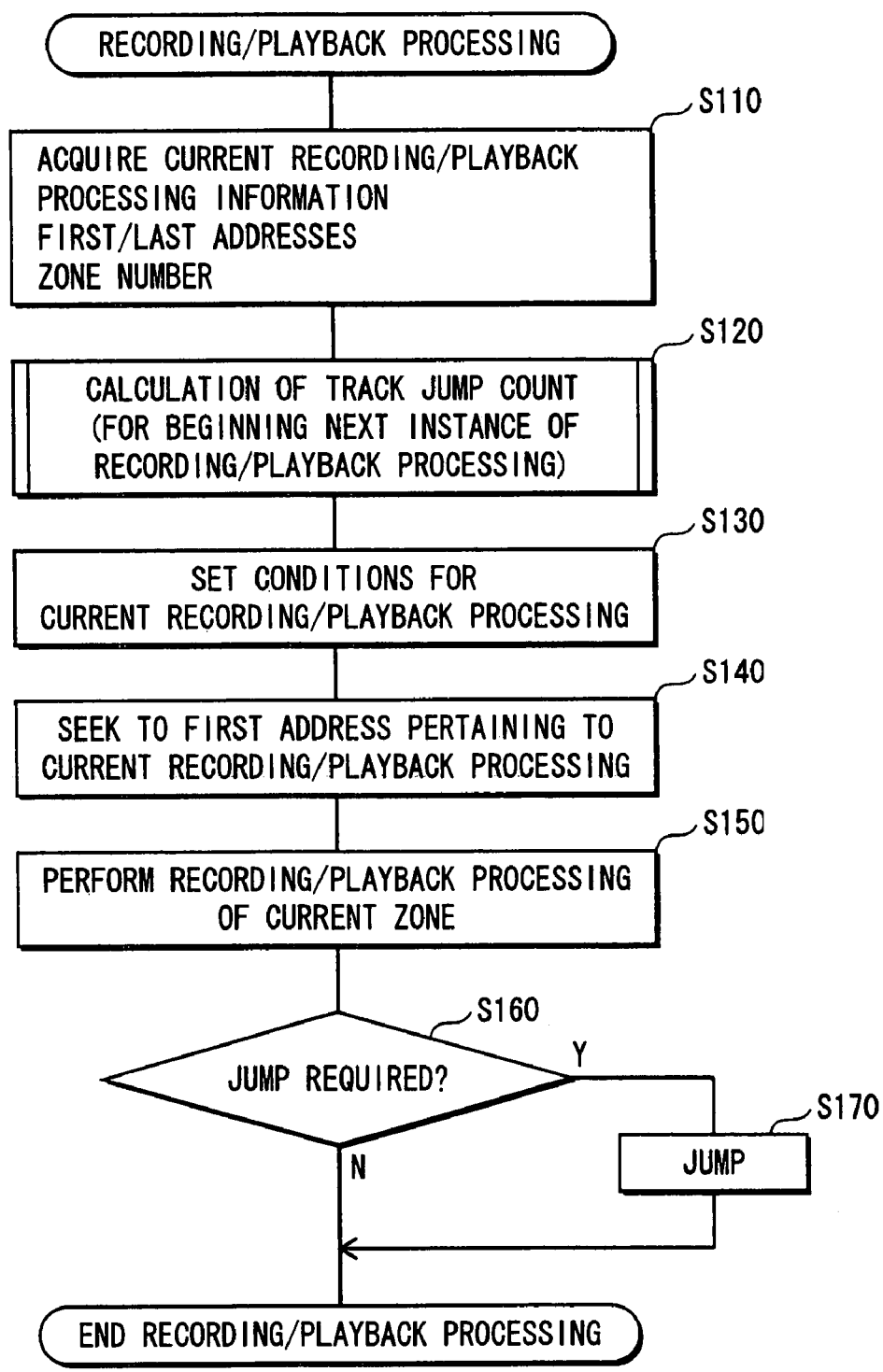
FIG. 7 is a flowchart showing recording/playback processing.
Figure 8:
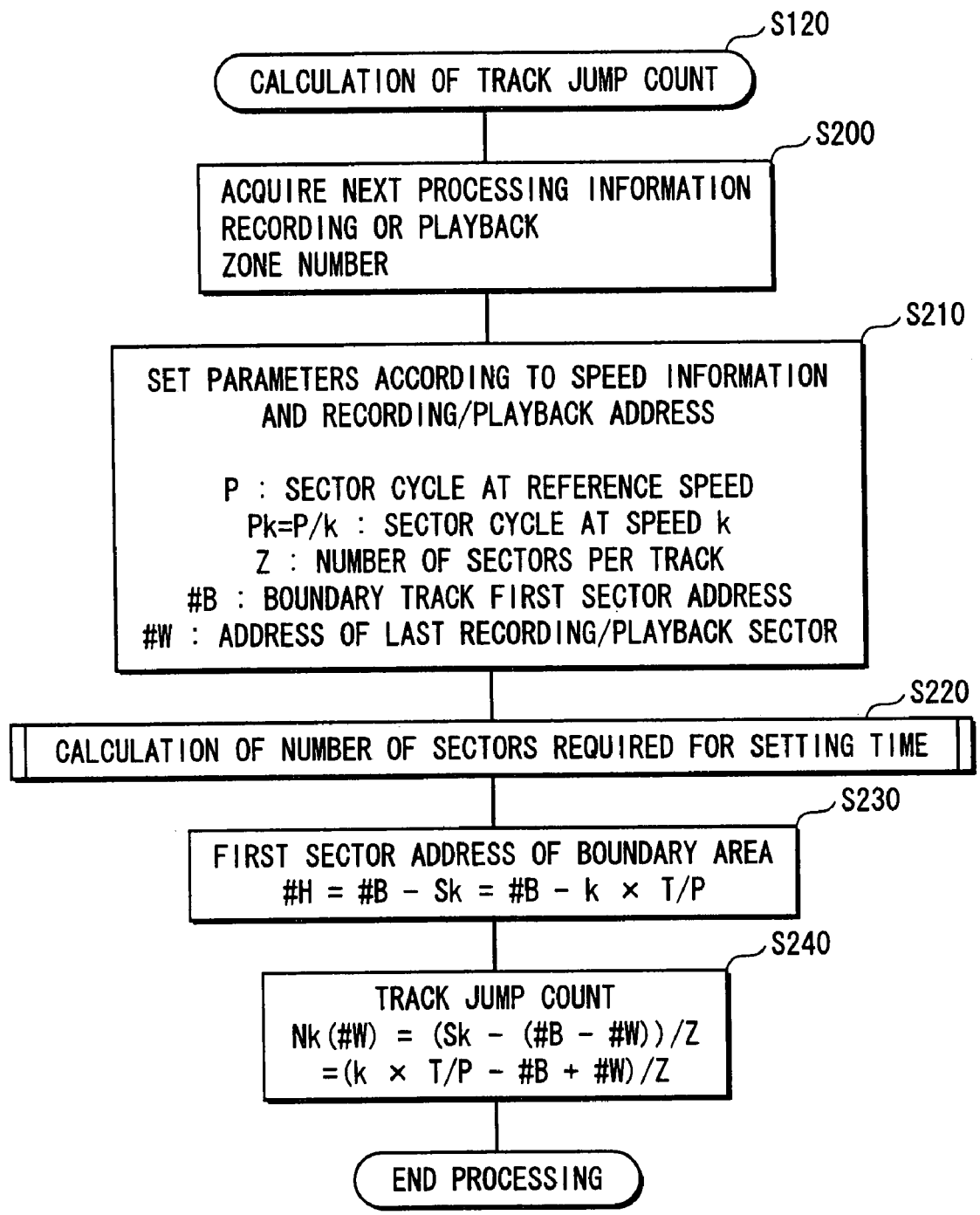
FIG. 8 is a flowchart showing processing for calculating a track jump count.
Figure 9:
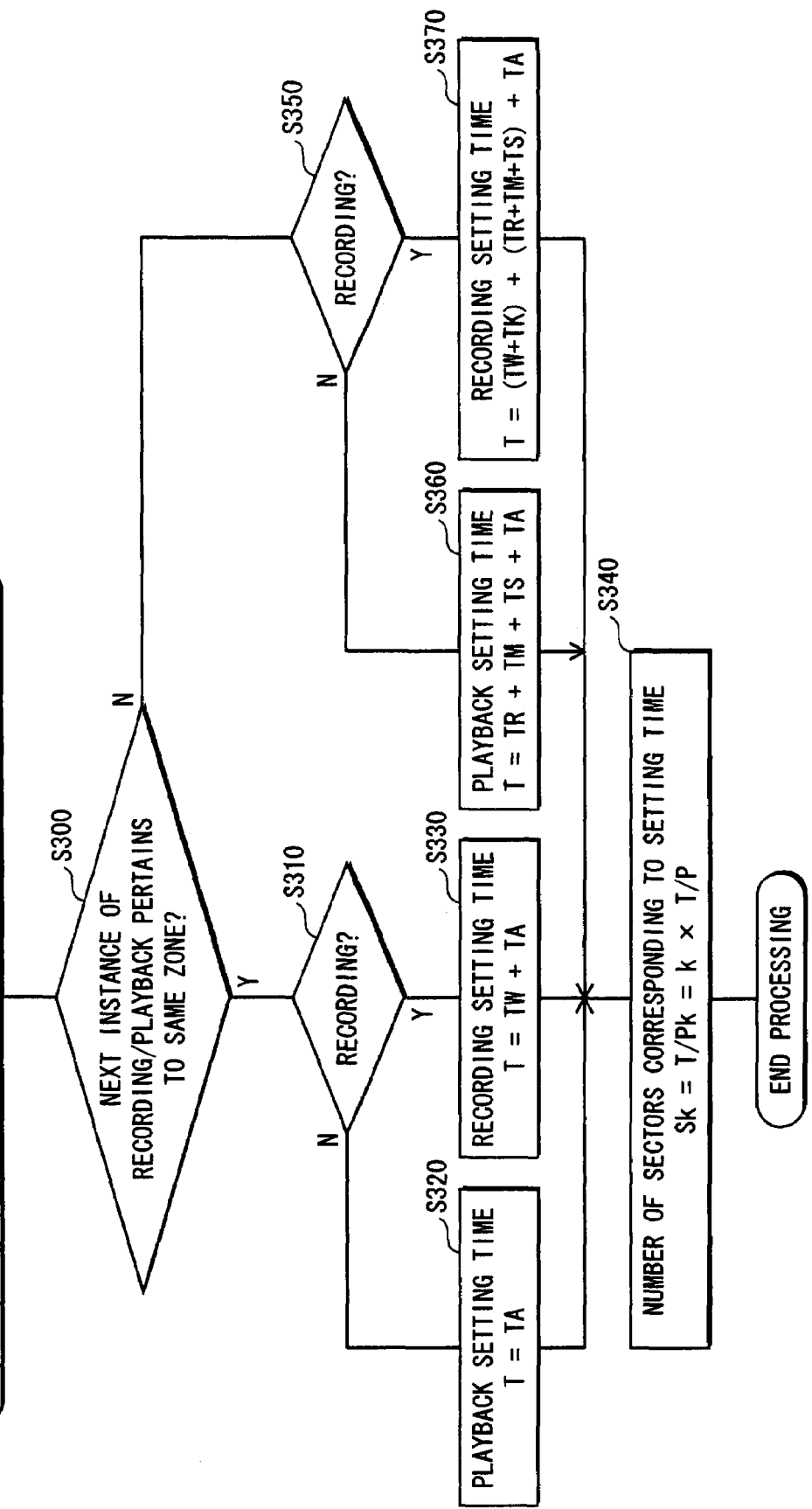
FIG. 9 is a flowchart showing processing for calculating a sector count required to ensure the setting time period.

The following describes operations of the disk access device with reference to FIG. 7, FIG. 8 and FIG. 9.

Figure 10:
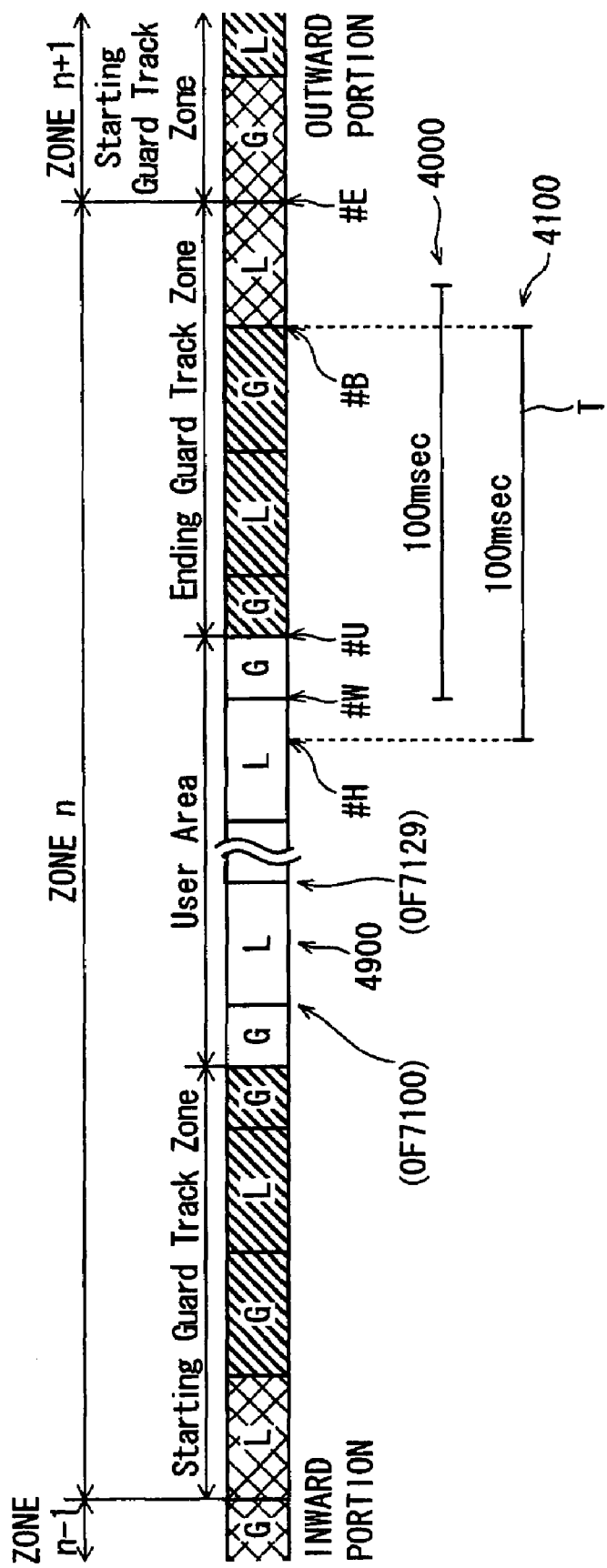
FIG. 10 shows a relationship between the guard track zone and the setting time period.

First is a description of principles of the present invention with reference to FIG. 10, and thereafter follows a description of operations of the disk access device with reference to the flowcharts of FIG. 7 to FIG. 9.

FIG. 10 shows a relationship between guard track zones and time periods required to configure settings for accessing the next zone (hereinafter, called "setting time period").

In FIG. 10, rectangles represents tracks, "G" represents groove tracks, and "L" represents land tracks. Since each track includes a plurality of sectors, positions of sectors in a track are indicated by sector numbers assigned in ascending order beginning with the most inward sector.

For example, a land track 4900 includes 41 sectors from sector number (0F7100) to sector number (0F7129) In FIG. 10, the sector numbers are represented by "#", and sector addresses are represented as follows.

(1) "#U" represents an address of a last sector of a user area (2) "#B" represents an address of a first sector of a boundary track (3) "#W" represents an address of a last recording/playback sector (4) "#E" represents an address of a last sector of a zone Note that #W and #U have the same value if recording/playback is performed until the last sector of a user area.

Here, the time (T) required to configure settings for the next instance of recording/playback is tentatively assumed to be 100 msec. Note that in this case, the time period originally for configuring settings (hereinafter, called "deferment time period") is the time period during which the light spot moves from the recording/playback last sector address (#W) to the boundary track first sector address (#B).

A settings-performance area 4000 indicates a number of sectors that the light spot moves from the current recording/playback last sector address (#W) in 100 msec, which is the time period required to configure settings for the next instance of recording/playback.

Here, the settings-performance area 4000 extends past the boundary track first sector address (#B). In other words, the setting time period exceeds the deferment time period.

In such a case, it is sufficient to shift the settings-performance area 4000 so as to end directly before the boundary track first sector address (#B), resulting in a settings-performance area 4100 that does not extend past the boundary track first sector address (#B).

The above operation is performed because it is most efficient to jump from directly before the boundary track first sector address (#B) to the next zone, without entering the zone boundary track.

Referring now to FIG. 10, it is sufficient to obtain the first sector address (#H) of the settings-performance area 4100, and begin configuring settings for the next instance of recording/playback after moving from the current recording/playback last sector address (#W) back to the obtained first sector address (#H).

Note that the setting time period and deferment time period can be expressed as sectors numbers, sector addresses, track counts, or the like.

The following shows methods for obtaining the time (T) required to configure settings for the next instance of recording/playback, the first sector address (#H), and the number of tracks to jump to arrive at the first sector address.

Method of Obtaining the Time (T) Required to Configure Settings for the Next Instance of Recording/Playback First, Eq. 1 shows an equation for obtaining the time (T) required to configure settings for the next instance of recording/playback. Here, the setting time is expressed in units of, for example, "msec". Also, the setting time period is substantially constant, regardless of recording speed.

(1) When the next processing is in a different zone
Next processing is recording:

$$T=T1=(TW+TK)+(TR+TM+TS)+TA$$

Next processing is playback:

$$T=T2=TR+TM+TS+TA$$

(2) When the next processing is in the same zone
Next processing is recording:

$$T=T3=TW+TA$$

Next processing is playback:

$$T=T4=TA \qquad \text{Eq. 1}$$

TW: recording power setting time
TK: servo condition setting time for recording
TR: playback power setting time
TM: rotation frequency setting time
TS: rotation frequency-dependent servo condition setting time
TA: address check time The following briefly describes the above notations.

Details of the Notations

The recording power setting time TW is the time required for setting a recording power. For example, recording speeds are different in each zone (the data rate is proportional to the recording speed) in cases such as recording to or playing back from a ZCLV formatted disk by CAV, or even in ZCLV recording where the rotation frequency difference between the inner portions and outer portions of the disk is reduced, and recording is performed at low speeds (e.g., 3×) in inner zones and at higher speeds (e.g., 5×) in outer zones. Normally, a higher optimal recording power is needed to ensure recording quality as the data rate increases. It is therefore desirable to change the value of the recording power according to the recording speed (data rate) of each zone.

The servo condition setting time for recording TK is a time required to configure settings such as switching a servo target position in playback and recording.

The playback power setting time TR is a time required for setting a playback power. For example, similarly to the aforementioned recording power, it is desirable to raise the playback power according to the playback speed of each zone. It is therefore necessary to change the value of the playback power according to the playback speed of each zone.

The rotation frequency setting time TM is a time required for setting the rotation frequency of the disk according to the zones. The rotation frequency of the disk must be set differently for each of the zones since all of the zones have the same data rate when recording/playing back by ZCLV at a certain speed.

The rotation frequency-dependent servo condition setting time TS is a time period required to configure settings such as switching the gain when the rotation frequency changes. Needless to say, it is desirable to set a higher servo gain for focusing and tracking as the rotation frequency increases.

The address check time TA is a time required for calculating a number of tracks between the current position and the next start position when performing a seek or Dump to the next processing start address. During this time, an address is acquired from the address signal generated by the ID reading circuit 600 based on the playback signal RF output from the matrix calculation circuit 20.

Note that the TW, TK, TR, TM, TS and TA times are normally determined according to a software processing speed in the microcontroller 100, and are substantially constant at all times. These times do not vary according to the zones or recording/playback speeds such as data rates.

As such, these times may be obtained in advance, stored in the microcontroller 100, and used each time to calculate T1, T2, T3 and T4. Also, T1, T2, T3 and T4 may be calculated using TW, TK, TR, TM, TS and TA, and stored in the microcontroller 100 in advance.

Alternatively, only T1, T2, T3 and T4 may be stored in the microcontroller 100 if they can be directly determined without obtaining TW, TK, TR, TM, TS and TA. Also, even if there is a change in the TW, TK, TR, TM, TS and TA to be applied at a certain speed, their values may be obtained according to the speed and used to determine T1, T2, T3 and T4 which are then stored in the microcontroller 100, or only reference values applied to a reference speed may be stored in the microcontroller 100, and values to be applied to a current speed may be calculated based on the reference values.

Method of Obtaining a First Sector Address (#H)

The following shows an equation (Eq. 2) for obtaining a first sector address (#H) with use of a setting time period (T) for the next instance of recording/playback.

$$\#H = \#B - Sk = \#B - k \times T/P$$

$$Sk = T/Pk = k \times T/P \qquad \text{Eq. 2}$$

P∝V, P∝1/f: sector cycle at reference speed
Pk=P/k[μsec]: sector cycle at speed k
S=T/P: number of cycles corresponding to setting time at reference speed
Sk=S×k: number of cycles corresponding to setting time at speed k
B: boundary track first address
V[m/sec]: reference linear speed
f[Hz]: reference rotation frequency Vk=k×V: linear speed at speed k fk=k×f rotation frequency at speed k Method of Obtaining a Track Count The following shows an equation (Eq. 3) for obtaining a number of tracks to be jumped in order to move back a number of sectors necessary for performing settings. It is most preferable to set the track jump count according to a recording/playback last sector address #W.

$$Nk(\#W) = (Sk - (\#B - \#W))/Z + \alpha \qquad \text{Eq. 3}$$
$$= (k \times T/P - \#B + \#W)/Z + \alpha$$

$Nk(\#W)$: track jump count $Z$: number of sectors per track $\alpha$: number of extra track In this way, the track jump count is determined according to the speed k, the setting time T, the sector cycle P, and the number of sectors per track Z. Determining the track jump count based on the above equation enables shortening the time for moving to the next zone since the head arrives at a position near the start of the boundary track after the setting time has elapsed.

Recording/Playback Processing

The following describes operations performed during recording/playback processing with reference to the flowcharts of FIG. 7, FIG. 8 and FIG. 9.

FIG. 7 is a flowchart showing recording/playback processing.

The processing shown in FIG. 7 is performed by the drive control unit 110.

The interface unit 130 receives, from a host external to the disk access device, an instruction to record or playback data.

In a case of recording, the interface 130 executes the recording instruction by transferring the data to the data control unit 120. In a case of playback, the interface 130 executes the playback instruction by transferring information for specifying a position where playback is to be performed to the data control unit 120.

Upon reception of the recording/playback instruction, the data control unit 120 specifies an amount of data that can be handled by the drive control unit 110, and outputs the recording/playback instruction to the drive control unit 110.

Upon reception of the instruction, the drive control unit 110 acquires, from the data control unit 120, a zone number and a first and last address of sectors pertaining to the instructed recording/playback of data (hereinafter, called a "current recording/playback", "current first address", "current last address" and "current zone") (step S110).

Also, the drive control unit 110 instructs the track count calculation unit 111 to calculate a number of tracks to be jumped for a next instance of recording/playback processing to be performed after the current recording/playback processing has been performed (step S120).

Upon receiving the instruction, the track count calculation unit 111 sends a calculated track count to the drive control unit 110.

The drive control unit 110 sets conditions for performing the current recording/playback processing (step S130). Specifically, the drive control unit 110 sets the servo conditions, the rotation frequency setting, and the like.

After performing the settings, the drive control unit 110 causes the head to seek to the first sector address where the current recording/playback is to be performed (step S140), and performs processing until the current last address (step S150).

Upon completing the processing through the current last address, the drive control unit 110 judges whether a jump is necessary (step S160). Specifically, the drive control unit 110 judges whether the track count calculated by the track count calculation unit 111 using the aforementioned Eq. 3 is less than or equal to 0 (zero). If the track count is less than or equal to 0, a jump is not performed (step S160:N).

In the case of performing a jump (step S160:Y), the drive control unit 110 instructs the drive addition circuit 60 to move the head back the number of tracks calculated by the track count calculation unit 111 (step S170).

The drive control unit 110 notifies the data control unit 120 that the recording/playback processing has ended. Upon receiving such notification, the data control unit 120 begins performing settings for recording/playback in the next zone, and after completing the settings processing, instructs the drive control unit 110 to jump to the next zone.

Upon receiving the instruction, the drive control unit 110 performs settings processing and the jump, and notifies the data control unit 120 that the settings processing and jump have been completed. Upon receiving the notification that the next zone has been jumped to, the data control unit 120 instructs the drive control unit 110 to perform the next instance of recording/playback processing.

In this case, the subsequent instance of recording/playback processing corresponds to the current recording/playback processing of step S110.

FIG. 8 is a flowchart showing track jump count calculation processing.

The processing shown in FIG. 8 is performed by the track count calculation unit 111.

Upon receiving the instruction from the drive control unit 110, the track count calculation unit 111 acquires information for the next instance of recording/playback processing from the data control unit 120 (step S200). For example, the track count calculation unit 111 acquires information pertaining to whether the next instance of processing is recording or playback processing, addresses for recording/playback, a zone number, and the like.

Next, the track count calculation unit 111 acquires and sets necessary parameters (step S210). The track count calculation unit 111 acquires speed information and recording/playback addresses from the drive control unit 110, and sets parameters such as rotation frequency. Such parameters are values such as a rotation frequency in the current zone.

Upon setting the parameters, the track count calculation unit 111 calculates the number of sectors required to ensure the setting time period (step S220) Details of such processing are described further below with reference to FIG. 9.

The track count calculation unit 111 obtains the first sector address (#H) of the settings-performance area (step S230), and obtains the track jump count (step S240).

FIG. 9 is a flowchart showing processing for calculating the number of sectors required to ensure the setting time period.

Here, the track count calculation unit 111 obtains the setting time period and the number of sectors corresponding thereto.

First, the track count calculation unit 111 determines whether the next instance of recording/playback pertains to the same zone where the current recording/playback processing is being performed. If the judgment is in the affirmative (step S300:Y), the track count calculation unit 111 judges whether the next instance of processing is recording or playback processing.

If the next instance of processing is recording processing (step S310:Y), the track count calculation unit 111 obtains the setting time period required to configure settings for the recording (step S330). If the next instance of processing is playback processing (step S310:N), the track count calculation unit 111 obtains the setting time period required to configure settings for the playback (step S320).

Also, if the next instance of recording/playback is not in the same zone where the current recording/playback processing is being performed (step S300:N), the track count calculation unit 111 judges whether the next instance of processing is recording or playback processing.

If the next instance of processing is recording processing (step S350:Y), the track count calculation unit 111 obtains the setting time period required to configure settings for the recording (step S370). If the next instance of processing is playback processing (step S350:N), the track count calculation unit 111 obtains the setting time period required to configure settings for the playback (step S360).

Upon obtaining the setting time period, the track count calculation unit 111 divides the setting time period by the sector cycle to obtain the required number of sectors (step S340).

Supplementary Remarks

Although a disk access device of the present invention has been described above based on the embodiment, the present invention is of course not limited to the embodiment. Variations such as the following are also included in the present invention.

(1) Although a predetermined area where tracking is unstable is the last track in the embodiment, the predetermined area may not include the entire track, may include a plurality of tracks, or may include only predetermined number of the last sectors of a boundary track.

(2) Although the number of sectors in the settings-performance area is calculated for each instance of processing even if the next instance of recording/playback processing is in the same zone as the current recording/playback processing in the embodiment, the first and last addresses of the settings-performance area may be stored and used again if the next processing pertains to the same zone.

(3) Although the setting time T is calculated for each case of recording/playback processing in the embodiment, the setting time T may be calculated in advance and stored if substantially constant regardless of the recording/playback speed.

(4) Although the embodiment has been described based on the assumption of a ZCLV formatted disk, the present invention can be applied to any kind of disk that is divided into zones, each of which includes a user area where recording is performed and that has guard track zones, which are areas where recording is not performed.

Also, needless to say, the present invention can be applied in cases such as when recording to or playing back from a ZCLV formatted disk by CAV, or even in ZCLV recording where the rotation frequency difference between the inner portions and outer portions of the disk is reduced, and recording is performed at low speeds (e.g., 3×) in inner zones and at higher speeds (e.g., 5×) in outer zones. The present invention can also be applied in a case of recording to or playing back from a CAV formatted disk that has been divided into zones, each of which has a different rotation frequency.

(5) The present invention may be realized as a computer program for causing a CPU to execute control processing (see FIG. 5 etc.) in order to implement the functions of the disk access device described in the embodiment. The computer program may be recorded on a recording medium, or transferred/distributed via various communication channels etc. The recording medium may be an IC card, an optical disk, a flexible disk, a ROM, a flash memory, or the like. The transferred/distributed program may be provided for use by being stored in a memory readable by a CPU in a device, and the various functions of the processing apparatus described in the embodiment can be realized by causing the CPU to execute the program.

(6) Note that the functional blocks of the microcontroller 100, the matrix calculation circuit 20, the TE detection circuit 30, the tracking control SW 40, the tracking control circuit 50, the drive addition circuit 60, the ID position detection circuit 70, and the drive hold circuit 90 of the disk access device 200 may be realized as an LSI, which is typified by an integrated circuit. The constituent elements of the present invention may be formed separately on single chips. Alternatively, a portion or all of the constituent elements may be formed together on a single chip.

It should be noted here that although the term LSI is used here, it may be called IC, system LSI, super LSI, ultra LSI or the like, depending on the level of integration.

Also, the integrated circuit is not limited to LSI, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

The present invention is useful in regard to the increasing speed of recording/playback processing in ZCLV formatted disks.

Although the present invention has been fully described by way of an example with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A disk access device that accesses a disk on which data recording is performed according to a format including a plurality of zones each including a user area where recording is performed, a guard track zone where recording is not performed being provided between each of the user areas, the disk access device comprising:

a head operable to read and write data from/to the disk;

an acquisition unit operable to acquire (i) deferment time information indicating a deferment time period that begins upon completion of data reading or writing in the user area of a currently accessed one of the zones and ends when the head enters a predetermined area of the guard track zone following the user area of the currently accessed zone, and (ii) setting time information indicating a setting time period for performing settings for data reading or writing in one of the plurality of zones to be accessed next; and a control unit operable to, if the deferment time period is shorter than the setting time period, move the head back, when data reading or writing in the currently accessed zone ends, to a position such that the setting time period ends before the head advancing from the position arrives at the predetermined area.

2. The disk access device of claim 1, wherein
the predetermined area of each guard track zone is a last track thereof.

3. The disk access device of claim 1, wherein
the position to which the head is moved is located such that the head advancing therefrom along a track by rotation of the disk arrives at a position directly before the predetermined area of the guard track zone following the user area of the currently accessed zone when the setting time period has ended.

4. The disk access device of claim 1, wherein
the acquisition unit includes a judgment subunit operable to judge whether the zone to be accessed next is the same as the currently accessed zone, and acquires the setting time information according to a result of the judgment, and
the control unit moves the head back, when data reading or writing in the currently accessed zone ends, to the position such that the head arrives at a position directly before the predetermined area of the guard track zone following the user area of the currently accessed zone when the setting time period has elapsed.

5. The disk access device of claim 1, wherein
the acquisition unit includes a judgment subunit operable to judge which of data reading and data writing is to be performed in the zone to be accessed next, and acquires the setting time information according to a result of the judgment, and
the control unit moves the head back, when data reading or writing in the currently accessed zone ends, to the position such that the head arrives at a position directly before the predetermined area of the guard track zone following the user area of the currently accessed zone when the setting time period has elapsed.

6. The disk access device of claim 1, wherein
the acquisition unit acquires the deferment time information in accordance with a disk rotation frequency of the currently accessed zone, and
the control unit includes a track count obtainment subunit operable to obtain a number of tracks the head is to be moved back, with use of the deferment time period, the setting time period and the disk rotation frequency, and moves the head back the obtained number of tracks.

7. The disk access device of claim 1, wherein
the acquisition unit acquires the deferment time information in accordance with a number of sectors per track of the currently accessed zone, and
the control unit includes a track count obtainment subunit operable to obtain a number of tracks the head is to be moved back, with use of the deferment time period, the setting time period and the number of sectors per track, and moves the head back the obtained number of tracks.

8. The disk access device of claim 1, wherein
the acquisition unit acquires the deferment time information in accordance with a sector cycle of the currently accessed zone, and
the control unit includes a track count obtainment subunit operable to obtain a number of tracks the head is to be moved back, with use of the deferment time period, the setting time period and the sector cycle, and moves the head back the obtained number of tracks.

9. An integrated circuit of a disk access device that performs, via a head, data reading and writing from/to a disk on which data recording is performed according to a format including a plurality of zones each including a user area where recording is performed, a guard track zone where recording is not performed being provided between each of the user areas, the integrated circuit comprising:
an acquisition unit operable to acquire (i) deferment time information indicating a deferment time period that begins upon completion of data reading or writing in the user area of a currently accessed one of the zones and ends when the head enters a predetermined area of the guard track zone following the user area of the currently accessed zone, and (ii) setting time information indicating a setting time period for performing settings for data reading or writing in one of the plurality of zones to be accessed next; and
a control unit operable to, if the deferment time period is shorter than the setting time period, move the head back, when data reading or writing in the currently accessed zone ends, to a position such that the setting time period ends before the head advancing from the position arrives at the predetermined area.

10. An access control program for causing a disk access device that accesses a disk on which data recording is performed according to a format including a plurality of zones to perform processing for controlling a head that reads and writes data from/to the disk, each of the zones including a user area where recording is performed, a guard track zone where recording is not performed being provided between each of the user areas, the access control program comprising the steps of:
acquiring (i) deferment time information indicating a deferment time period that begins upon completion of data reading or writing in the user area of a currently accessed one of the zones and ends when the head enters a predetermined area of the guard track zone following the user area of the currently accessed zone, and (ii) setting time information indicating a setting time period for performing settings for data reading or writing in one of the plurality of zones to be accessed next; and
if the deferment time period is shorter than the setting time period, moving the head back, when data reading or writing in the currently accessed zone ends, to a position such that the setting time period ends before the head advancing from the position arrives at the predetermined area.

* * * * *